Sheet 1 - 4 Sheets.

J. W. Mulley.

Mower.

No 860 Reissued Nov. 29, 1859

Witnesses.
W. Lanfax
Wm. M. Rawlins

Inventor
J. W. Mulley
by
E. S. Blake his atty

J. W. Mulley.

Mower

No 860 Reissued Nov 29, 1859.

Witnesses.

W. Fairfax

Wm H. Rawlins

Inventor.

J. W. Mulley by

A. Pollock his atty

J. W. Mulley.

Mower.

No. 860 Reissued Nov. 29, 1859.

Witnesses.

W. Sanford

Wm. H. Rawlins

Inventor.

J. W. Mulley by A. Pollock his atty

J. W. Mulley.

Mower.

No. 860 Reissued Nov. 29. 1859.

Witnesses.

A. D. Faber

W. Fairfax.

Inventor:

J. W. Mulley by

A. Pollak his atty

UNITED STATES PATENT OFFICE.

JEREMIAH W. MULLEY, OF AMSTERDAM, NEW YORK.

IMPROVEMENT IN REAPING AND MOWING MACHINES.

Specification forming part of Letters Patent No. 16,599, dated February 10, 1857; Reissue No. 860, dated November 29, 1859.

DIVISION B.

*To all whom it may concern:*

Be it known that I, JEREMIAH W. MULLEY, of Amsterdam, in the county of Montgomery and State of New York, have invented a certain new and useful Improvement on Mowing and Reaping Machines; and I hereby declare the following to be a full and clear description thereof, reference being had to the accompanying drawings, which form part of this specification, and in which—

Figure 1:
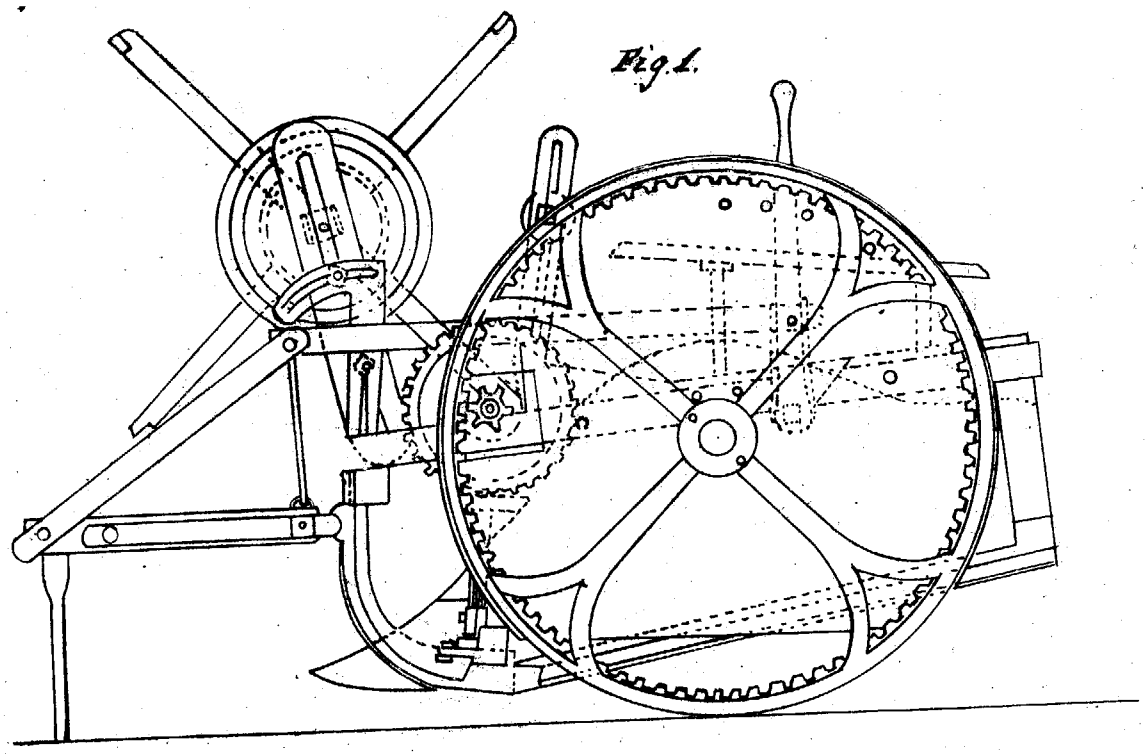
Figure 2:
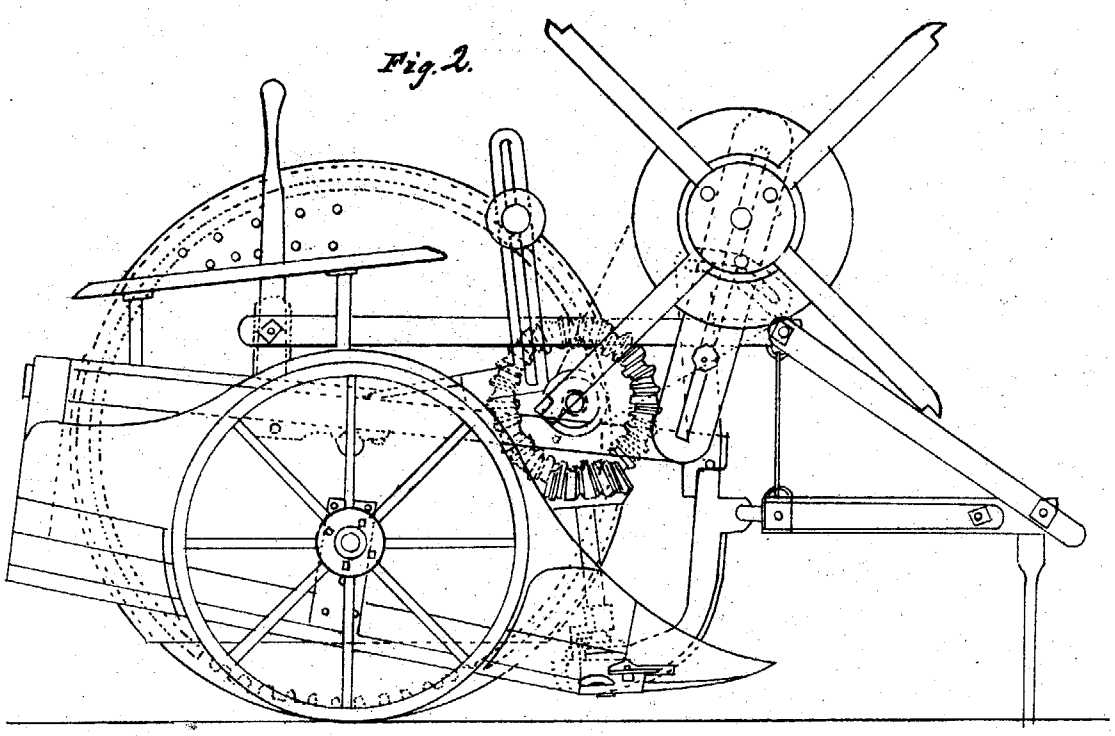
Figure 3:
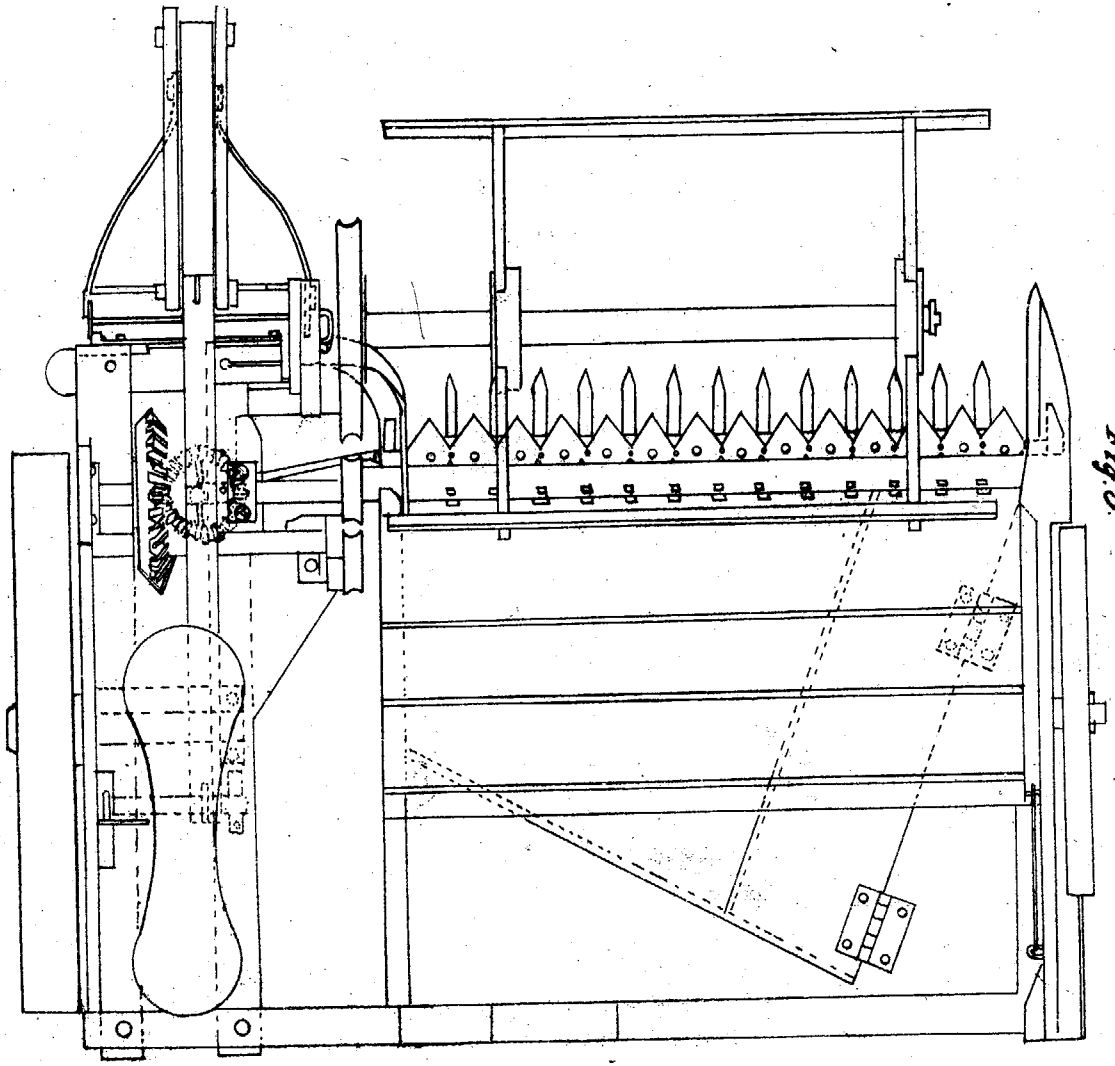
Figure 5:
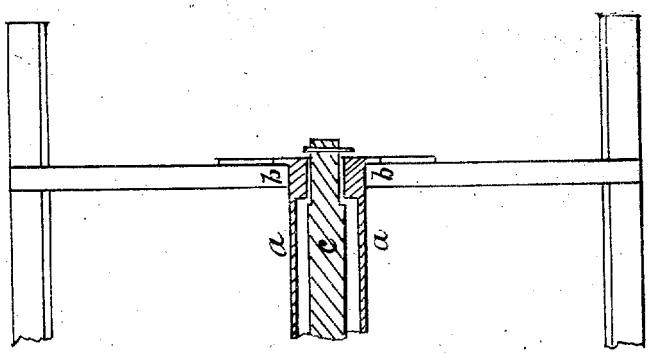
Figure 5:
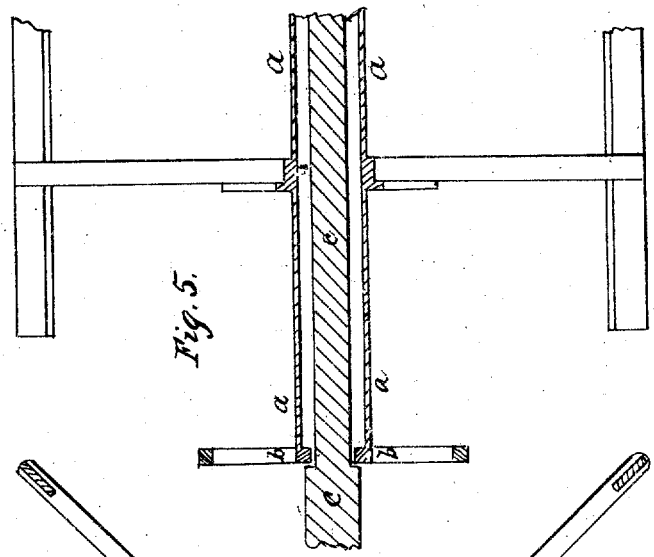
Figure 4:
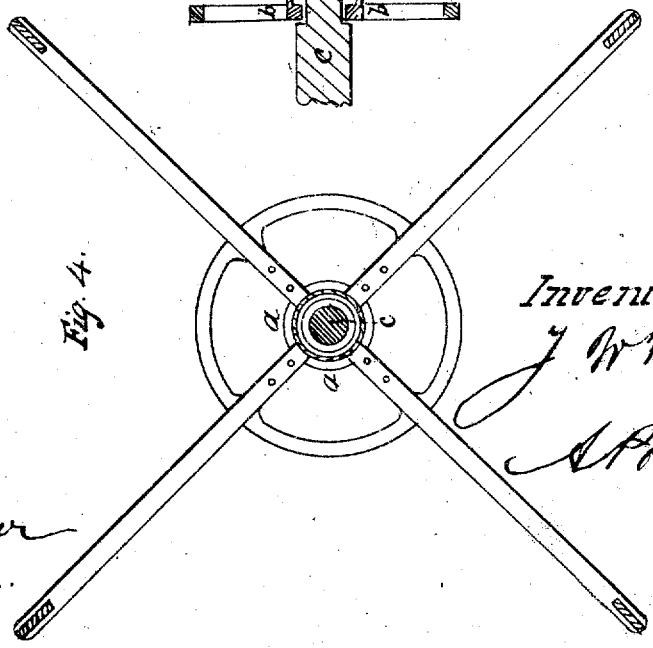

Figures 1, 2, and 3 represent views in elevation and plan of a harvester with my improvement applied to it, and Figs. 4 and 5 represent longitudinal and transverse sections of a harvester-reel constructed according to my improvement.

This my improvement relates to a certain construction of the reel and mode of hanging the same, and I therefore shall not specially refer in the present specification to the other portions of the machine, nor yet describe the general action and use of the reel, as such are well understood.

In the accompanying drawings, the reel A is represented as occupying its ordinary general position on the machine. It may be rotated by belt or in any other suitable manner, and be of any desired length and diameter, also of any appropriate general construction, subject to the improvement hereinafter named. The shaft *a* of the reel is made hollow, of sheet metal or any other suitable material, and is provided at or near each end with a box, wheel, or disk, *b b*, arranged to constitute bearings for the support and free and easy run of the reel on an arm, *c*, supported only at its one end and disposed to project along or through the hollow reel-shaft *a*. Said arm *c*, I prefer should be adjustably held on the draft side of the machine in such a manner as that it may be raised or lowered and be set forward or back to give the desired adjustability to the reel. This may be done by securing said arm in a slotted hook-piece, *d*, and slotted lever *e*, on the draft side of the machine, or it may be done in any other suitable manner; but it is necessary that the support given said arm should be a firm one, as it is sustained only on the one side of the machine, or otherwise the arm would sag by reason of its being unsupported at its opposite end, where the reel also has a bearing on it. By such construction and mode of hanging not only is facility of adjustment secured to the reel by reason of alteration in the set only being needed at the one side, and a clear or open space given to the reel, so far as any obstructing support is concerned, at its end next to the standing grain, and whereby choking of the reel is avoided, the latter readily unshipped when required, and several other well-known advantages obtained; but many of the objections peculiar to a one-sided support or hang of the reel are avoided. Thus the reel-shaft *a* is supported at its ends only, or at distant points, in contradistinction to a bearing-surface throughout its length on the carrying-arm *c*, whereby friction is reduced and ease and steadiness given to the reel in its run, as well as lightness and adequate strength secured to it in its construction.

The tubular shaft *a* serves to unite the opposite ends of the reel, and working by bearings *b b* at or near the ends of the reel, on the carrying-arm *c*, the reel is stiffened at its ends, while a certain elasticity is secured to the intermediate portion of the reel-shaft, that greatly reduces the tendency to breakage of the reel.

By hanging the reel-shaft at its opposite ends on an arm supported only at its one end strainage or vibration of said arm is reduced by reason of the resistance which the reel encounters being transferred direct or quickly to, and to a large degree concentrated on, the inner reel-bearing and in close proximity to where the carrying-arm has its support, the springing of the carrying-arm at its outer end, by pressure on or of the reel, causing the inner reel-bearing to receive extra strain, which extra strain occurs at or near the root of the carrying-arm, where it is strongest and subject to less vibration.

Having thus fully described my said improvement and the manner in which the same is or may be carried into effect, I shall state my claim as follows:

The hollow reel-shaft, made of sheet metal or its equivalent, formed with boxes or bearings at or near each end, and made to revolve on an arm supported at one end only, substantially as specified.

In testimony whereof I have signed my name to this specification before two subscribing witnesses.

J. W. MULLEY.

Witnesses:

JOHN A. HANSON,

H. S. MCELWAIN.